United States Patent [19]
Goossen

[11] Patent Number: 5,870,221
[45] Date of Patent: Feb. 9, 1999

[54] MICROMECHANICAL MODULATOR HAVING ENHANCED PERFORMANCE

[75] Inventor: Keith Wayne Goossen, Aberdeen, N.J.

[73] Assignee: Lucent Technologies, Inc., Murray Hill, N.J.

[21] Appl. No.: 901,050

[22] Filed: Jul. 25, 1997

[51] Int. Cl.[6] .................................................. G02B 26/00
[52] U.S. Cl. .......................................... 359/290; 359/291
[58] Field of Search .................................. 359/290, 291, 359/318, 302, 263, 298

[56] References Cited

U.S. PATENT DOCUMENTS

| | | | |
|---|---|---|---|
| 5,500,761 | 3/1996 | Goossen et al. | 359/290 |
| 5,589,974 | 12/1996 | Goossen et al. | 359/290 |
| 5,646,772 | 7/1997 | Yurke | 359/290 |
| 5,659,418 | 8/1997 | Yurke | 359/290 |
| 5,677,783 | 10/1997 | Bloom et al. | 359/291 |
| 5,701,193 | 12/1997 | Vogel et al. | 359/290 |
| 5,710,656 | 1/1998 | Goossen | 359/291 |
| 5,793,519 | 8/1998 | Furlani et al. | 359/291 |

*Primary Examiner*—Georgia Epps
*Assistant Examiner*—Margaret Burke

[57] ABSTRACT

A modulator having low insertion and a broad operating bandwidth is disclosed. The modulator has a movable membrane that is spaced from a substrate. The reflectivity of the movable membrane, and the reflectivity of the subtrate/gap interface are unequal. In particular, relative to the membrane, the substrate has a lower reflectivity. Device finesse is dictated by the lower reflectivity "mirror," i.e., the substrate. The substrate configuration thus provides a broad operating bandwidth while the higher reflectivity membrane provides low insertion loss.

5 Claims, 3 Drawing Sheets

MICROMECHANICAL MODULATOR HAVING ENHANCED PERFORMANCE

FIELD OF THE INVENTION

The present invention relates to optical modulators. More particularly, the present invention relates to a micromechanical optical modulator having low insertion loss and a broad operating bandwidth.

BACKGROUND OF THE INVENTION

A typical Fabry-Perot cavity optical modulator has two high and equal reflectivity dielectric mirrors separated by a gap. The mirrors have a nominal thickness equal to one-quarter of the operating wavelength ("quarter-wave") of the modulator. Usually, one of the mirrors is fixed and the other is movable towards the fixed mirror. As a voltage is applied across the two mirrors, the movable mirror moves toward the fixed mirror, decreasing the gap between the mirrors. Modulator reflectivity varies with the size of the gap. See, for example, Marxer et al., "MHz Opto-Mechanical Modulator," Transducers '95—Eurosensors IX, Royal Swedish Academy of Eng. Sciences, Stockholm (June 1995), pp. 289–292.

Fabry-Perot cavity modulators are high finesse devices. Finesse is given by the expression: $F=4R/(1-R)^2$, where R is the mirror reflectivity, which is the same for both mirrors. Mirror reflectivity is given by $[(n^2-n_o)/(n^2+n_o)]^2$, where n is the refractive index of the material comprising the mirror and $n_o$ is the refractive index of the underlying medium, typically air. Thus, for a Fabry-Perot cavity modulator having polysilicon mirrors (n=3.5, $n_o$=1): R=72 percent and F≈37. Such modulators can achieve high reflectivity, i.e., low insertion loss; with theoretical device reflectivity exceeding ninety percent. Unfortunately, as a result of its high finesse, a Fabry-Perot cavity modulator typically has a relatively narrow operating bandwidth, e.g., about 5 nanometers (nm) centered around a center operating wavelength.

A lower finesse modulator is disclosed in U.S. Pat. No. 5,500,761. That modulator has a quarter-wave movable membrane separated by a gap from a substrate layer. The movable membrane incorporates a layer having a refractive index that is about equal to the square root of the substrate's refractive index. The movable membrane and the substrate have equal reflectivities. Under applied voltage, the movable membrane moves toward the substrate layer, changing the size of the gap. Changing the gap size results in a change in device reflectivity.

As previously noted, the modulator described in U.S. Pat. No. 5,500,761 has a lower finesse than a typical Fabry-Perot cavity device. In particular, membrane and substrate reflectivity R is about 31 percent and finesse is about 2.6. Such a modulator is characterized by a maximum device reflectivity of about seventy-two percent. Due to its lower finesse, that modulator advantageously possesses a significantly broader operating bandwidth than a Fabry-Perot modulator, in particular about 50 to 60 nm around a center operating wavelength.

Thus, in the prior art, one can select a modulator providing low insertion loss but narrow operating bandwidth, or higher insertion loss and broader operating bandwidth. It would be desirable, however, to have an optical modulator providing the best characteristics of the prior art modulators. Such a modulator would have the low insertion loss of the standard Fabry-Perot cavity modulator, and also possess the relatively broad operating bandwidth of the modulator disclosed in U.S. Pat. No. 5,500,761.

SUMMARY OF THE INVENTION

A micromechanical optical modulator having low insertion loss and a broad operating bandwidth is disclosed. Unlike conventional modulators, the present modulator includes unequal reflectivity "mirrors." The invention is based on the discovery, quite unexpected, that in a modulator incorporating unequal reflectivity mirrors, the operating bandwidth is determined by the lower reflectivity mirror. Thus, by maintaining the low finesse substrate arrangement disclosed, for example, in U.S. Pat. No. 5,500,761, the present modulator possesses a similarly broad operating bandwidth. Yet, by deviating from the membrane arrangement disclosed in U.S. Pat. No. 5,500,761 and adopting one having higher reflectivity, the present modulator possesses the low insertion loss characteristic of high finesse Fabry-Perot devices.

The present modulator has a movable membrane that is spaced from a substrate. As noted above, the reflectivity of the movable membrane, and the reflectivity of the subtrate/gap interface are unequal. In some embodiments, the membrane is comprised of at least two layers: an overlayer having a refractive index that is about equal to the square root of the refractive index of the substrate, and an underlayer having a refractive index that is about equal to that of the substrate. The thickness of the overlayer and underlayer are permuted from the conventional quarter wavelength. Modulator reflectivity in both the "on" state and the "off" state is greater, i.e., insertion loss is lower, than the reflectivity of the modulator disclosed in U.S. Pat. No. 5,500,761, hereinafter, "the broad-bandwidth modulator."

In particular, since overlayer thickness is less than one quarter of the operating wavelength, which thickness is characteristic of the broad bandwidth modulator, device reflectivity is greater (insertion loss is less) than the on-state reflectivity of the broad-bandwidth modulator. In particular, such on-state reflectivity can be as high as about ninety percent, as compared to about seventy-two percent for the broad bandwidth device. Off-state reflectivity of the present modulator is greater than the zero reflectivity achieveable with the quarter-wave thick layer of the broad bandwidth modulator. As such, the present modulator disadvantageously has a lower contrast than is achieveable with the broad-bandwidth modulator.

Thus, the present modulator trades contrast ratio for low insertion loss and broad operating bandwidth. A variety of optical communications applications require an insertion loss less than about 1 dB and a contrast of about 12/1 or greater. By suitably selecting membrane layer thickness, the present modulator can achieve such criteria while advantageously providing a 60 nm operating bandwidth.

BRIEF DESCRIPTION OF THE DRAWINGS

Further features of the invention will become more apparent from the following detailed description of specific embodiments thereof when read in conjunction with the accompanying Figures in which.

DETAILED DESCRIPTION

Figure 1:
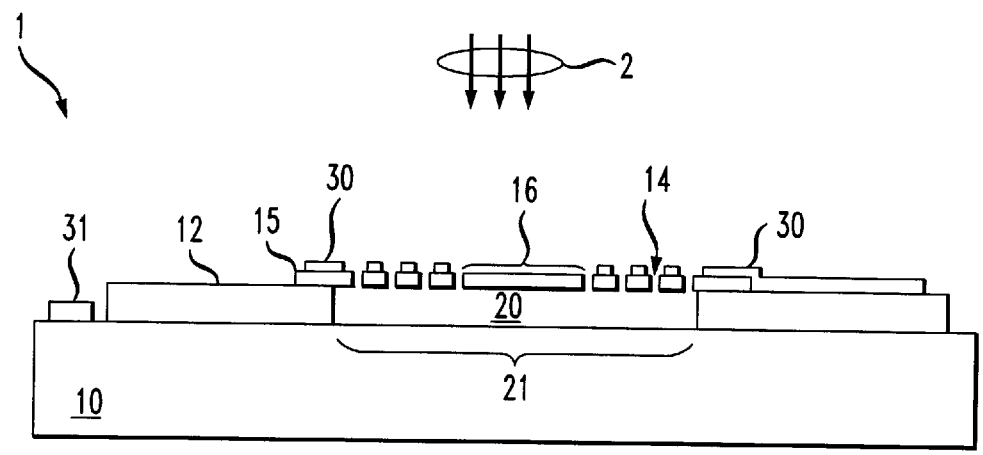
FIG. 1 is a cross-sectional side view, through the line A—A in FIG. 2, of an exemplary modulator according to the present invention.
Figure 2:
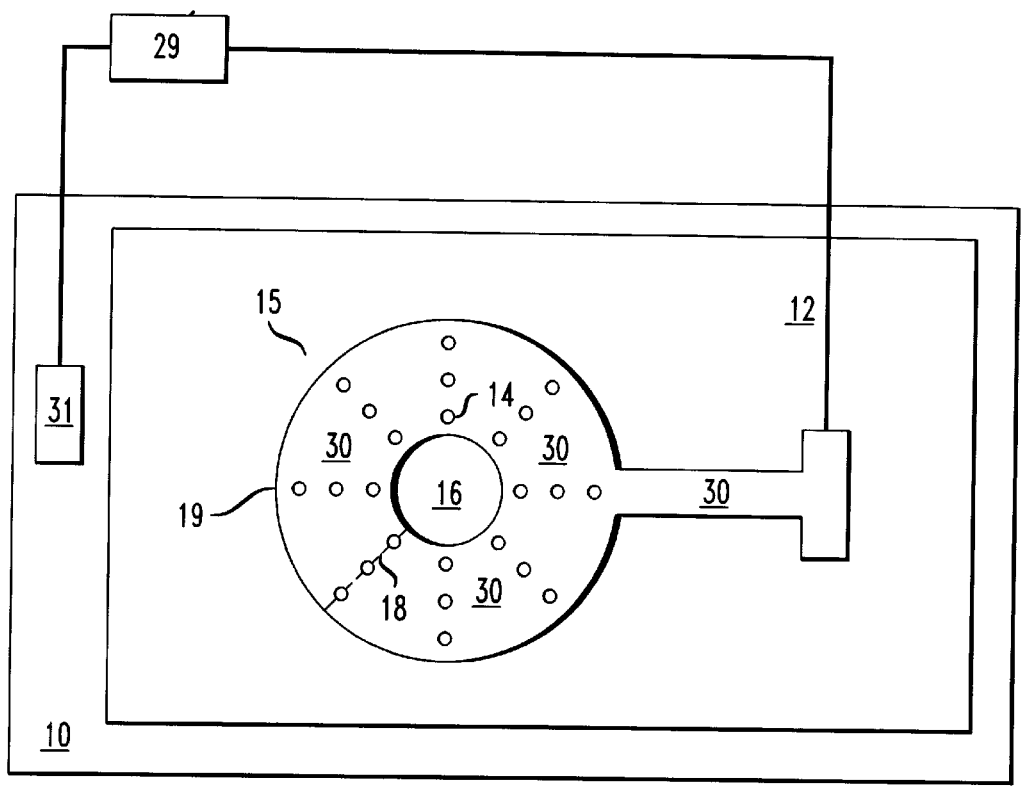
FIG. 2 is a plan view of the modulator of FIG. 1.

FIGS. 1 and 2 show a preferred embodiment of a micromechanical modulator 1 according to the present invention. As shown in FIG. 1, the device comprises a substrate 10 and membrane 15. The membrane is comprised of one or more, and preferably two, material layers.

The membrane 15 and substrate 10 are spaced from each other defining a gap 20 between them. In preferred embodiments, the modulator has a "drum-head" membrane, as described further below and in U.S. Patent application Ser. No. 08/565,453. That patent application, and all other patent applications, patents or other publications referenced in this specification are incorporated by reference herein.

For embodiments using a drum-head membrane, the membrane 15 preferably includes a plurality of holes 14, which can be radially arranged as illustrated in FIG. 2. The holes 14 aid in damping membrane vibration and are also used during modulator fabrication, as described later in this specification. The holes 14 are patterned in the membrane 15 beginning outside of a centrally located region 16 and radiate toward the periphery 19 of the membrane 15. The centrally located region 16 forms an "optical window". The optical window is placed in optical communication with an optical waveguide or fiber that delivers an optical signal 2 to the modulator. The holes 14 are absent from the optical window since their presence in that region of the membrane would deleteriously effect the optical properties of the modulator 1.

In the aforementioned preferred configuration, the membrane 15 overlaps the periphery of the modulator cavity 21 along most of such periphery. In a preferred embodiment, the membrane 15 overlaps the periphery of the modulator cavity 21 at substantially every point. In a preferred embodiment, the membrane 15 is circular, as shown in FIG. 2. It should be understood that other configurations, such as those described in U.S. Pat. No. 5,500,761 wherein the membrane is supported by a plurality of support arms, can suitably be used in conjunction with the present modulator.

Figure 3:
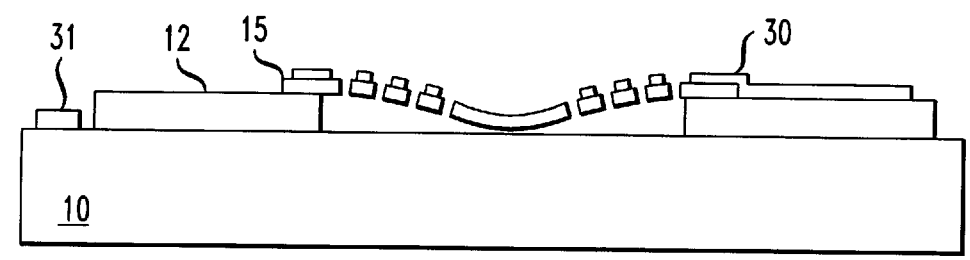
FIG. 3 shows the modulator of FIG. 1 in the on-state.

The substrate 10 and the membrane 15 are preferably suitably conductive so that a biasing signal may be applied across them generating an electrostatic force. This force places the modulator in an "on-state," causing the membrane 15 to move from its "off-state" or quiescent position towards the substrate. FIG. 3 shows a conceptual illustration of the modulator of FIG. 1 in the on-state. As the membrane moves from its unbiased position, the reflectivity of the modulator 1 to the incident optical signal 2 changes.

The biasing signal can be supplied by a controlled voltage source 29. A contact 31 may be formed on the substrate 10 to facilitate electrical connection with the controlled voltage source 29. The controlled voltage source is also electrically connected to the membrane 15. The modulator may suitably be formed on a semiconductor chip or wafer.

Relative reflectivity maxima are encountered when the gap 20 is equal to odd integer multiples of one-quarter of the operating wavelength, i.e., $m\lambda/4$ where m=1, 3, 5. . . . Furthermore, such modulators will exhibit relative reflectivity minima when the gap 20 is 0 or an even integer multiple of one-quarter of the operating wavelength, i.e., $m\lambda/4$ where m=0, 2, 4 Thus, the best contrast is obtained when, in one state of the modulator, i.e., biased or unbiased, the gap 20 results in a reflectivity minima, and in the other state, the gap 20 results in a reflectivity maxima. Thus, in some preferred embodiments, the gap 20 changes by an amount $\lambda/4$ under bias.

Preferably, the substrate 10 is formed of a conductive material, which is either transparent or absorbing over the operating optical bandwidth. Suitable materials include, but are not limited to, silicon, gallium arsenide, indium phosphide, germanium or indium tin oxide (ITO) coated glass. If a semiconductor is used for the substrate, it should preferably be appropriately doped. For example, if the substrate is silicon, it is preferably doped with any Group III or Group V element, typically phosphorous or boron. Such doping should enhance device speed.

If the substrate is formed of a material that is insufficiently conductive for a modulator according to the present invention, conductivity can be increased or imparted by doping the substrate with suitable materials. Doping methods include ion implantation, selective diffusion and other methods known to those skilled in the art.

As previously noted, the membrane 15 should be suitably conductive, as well. Such conductivity may be provided by any of the membrane layers present, e.g., 15a, 15b, etc. Membrane layers comprised of, for example, doped amorphous or polycrystalline silicon or ITO are suitably conductive. Alternatively, conductivity may be provided by an additional conductive layer 30 disposed on the overlayer 15a, as shown in FIGS. 1, 2 and 3. Any suitably conductive material may be used to form the conductive layer 30, including, without limitation, aluminum, platinum, tungsten, conducting silicon, ITO, gold, or alloys of these materials such as, without limitation, chromium/gold or titanium/gold. Further, silicides or appropriately-doped amorphous silicon or polycrystalline silicon are suitable for use as the conductive layer. It will be appreciated that if the conductive layer 30 is optically opaque over the operating bandwidth of the modulator, then the conductivel layer 30 must not be disposed on the centrally-located region 16 of the membrane 15 that forms the optical window.

As previously described, the membrane 15 includes a plurality of holes 14. In the embodiment shown in FIG. 2, the holes 14 are aligned along a plurality of radii 18. In a preferred embodiment, the holes should be arranged along a square or hexagonal array. The holes are sized and spaced to optimize damping of the membrane 15.

In some embodiments of the present invention, the membrane 15 is comprised of a single layer of material. The single layer of material has a refractive index, $n_m$, about equal to the refractive index, $n_s$, of the substrate 10. The single layer membrane can be, for example, polysilicon or silicon, or any of the other materials mentioned as suitable for use as the substrate as long the proviso $n_m \approx n_s$ is satisfied. The width of the single layer of material is $\lambda/4$. Such a width provides maximum device reflectivity.

In preferred embodiments of the present invention, the membrane 15 is comprised of two layers. Using a two-layer membrane decreases the reflectivity somewhat compared to the single-layer membrane embodiment. The contrast ratio, however, is improved.

One of the two membrane layers is an overlayer 15a having a refractive index, $n_o$, that is within the range of about 0.8 to about 1.2 times the square root of the refractive index, $n_s$, of the substrate 10. Preferably, $n_o = n_s^{0.5}$. The overlayer 15a can be, for example, silicon oxide or, more preferably, silicon nitride. It will be appreciated that the refractive index of the overlayer 15a may have to be specifically tailored for the preferred embodiment wherein $n_o = n_s^{0.5}$. Methods for tailoring the refractive index of materials, such as silicon nitride, are known to those skilled in the art. See, for example, Walker et al., "Gas Composition Dependence of Silicon Nitride Used as Gallium Diffusion Barrier During GaAs Molecular Beam Epitaxy Growth on Si Complementary Metal Oxide Semiconductor," v.23 (10) J. Elec. Mat., pp. 1081–83 (1994).

The other membrane layer is an underlayer 15b having a refractive index, $n_u$, that is about equal the refractive index, $n_s$, of the substrate 10. The thickness $t_o$ of the overlayer 15a and the thickness $t_u$ of the underlayer are each less than one-quarter of the operating wavelength. Further description of layer thickness is provided below in conjunction with graphical analysis presented in FIGS. 4 & 5.

Figure 4:
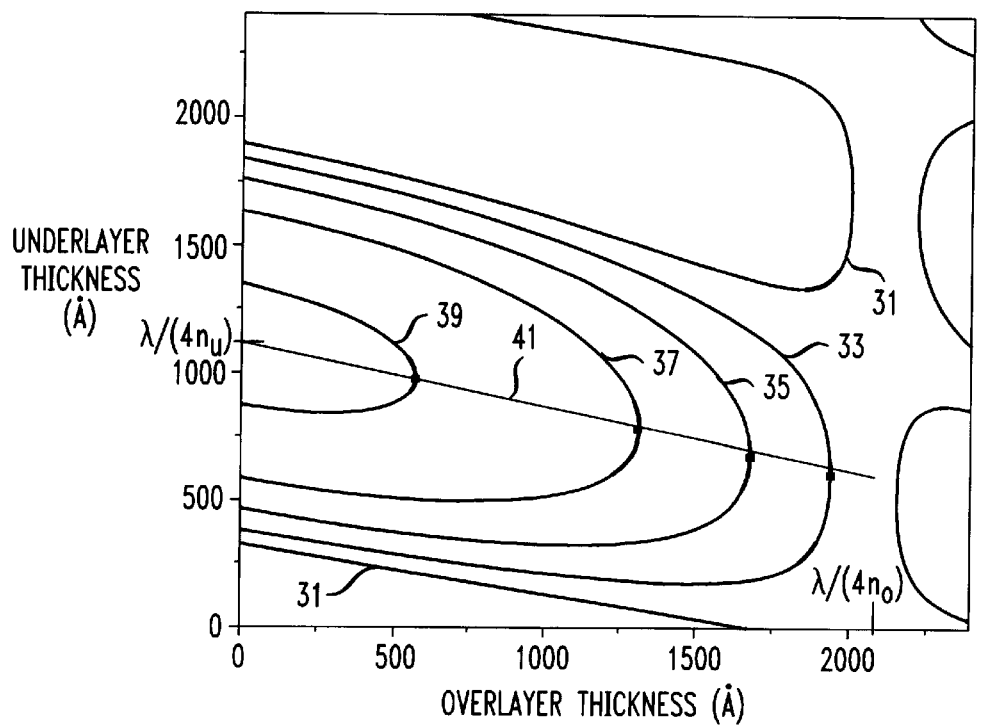
FIG. 4 shows a contour plot of on-state reflectivity as a function of underlayer and overlayer thickness.

FIG. 4 is a contour plot showing contours of maximum on-state reflectivity as a function of overlayer and underlayer thickness. Contours are shown for 70, 75, 80, 85 and 90 percent reflectivity. Those contours are identified by respective reference numerals 31, 33, 35, 37, and 39. It will be appreciated by those skilled in the art that other contours corresponding to reflectivities less than 70 percent exist. Such lower reflectivity contours are not shown on FIG. 4 for clarity. It should also be understood that in other embodiments, on-state reflectivity is the low-reflectivity state and the off-state reflectivity is the high-reflectivity state. The difference between such embodiments is simply the gap spacing. That is, if the off-state gap spacing is an odd multiple of $\lambda/4$, rather than an even multiple, maximum reflectivity will be observed in the off-state.

Figure 5:
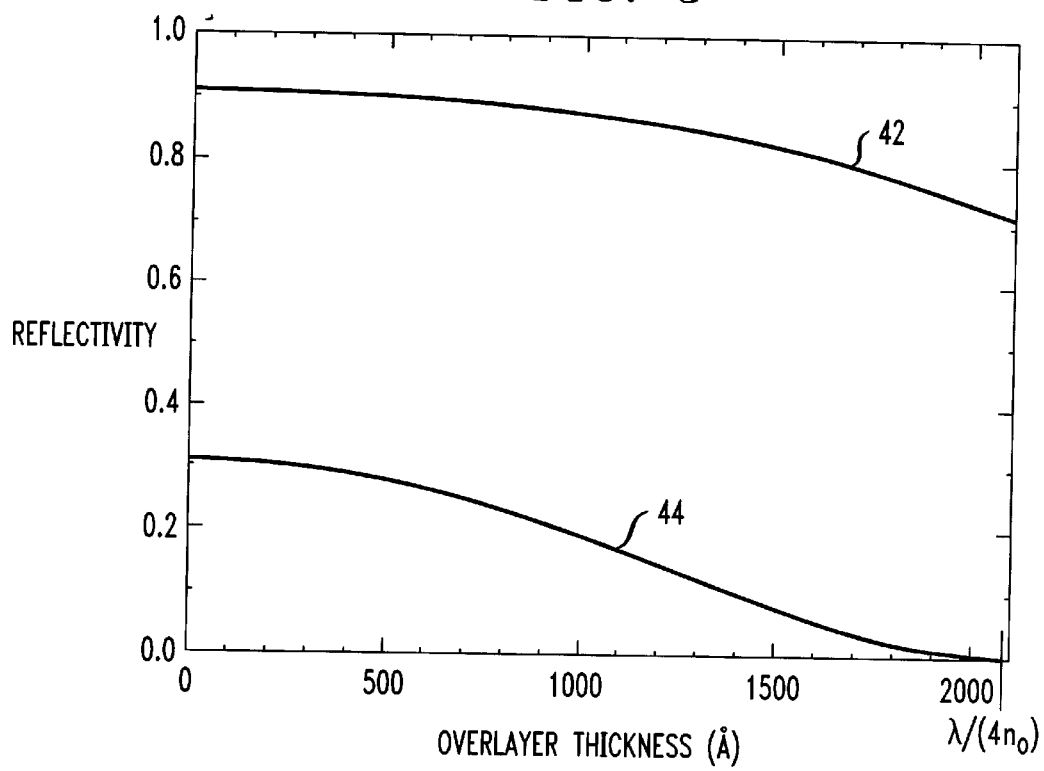
FIG. 5 shows on- and off-state reflectivity as a function of membrane overlayer thickness.

FIG. 5 is a plot of reflectivity versus overlayer thickness for a two-layer membrane with the substrate 10 and underlayer 15b having a refractive index of 3.48, the overlayer 15a having a refractive index of $3.48^{1/2}$, a center operating wavelength of 15500 angstroms, a gap 20 of $3\lambda/4$ in the on-state and $\lambda/2$ in the off-state. Plot 42 shows on-state reflectivity and plot 44 shows off-state reflectivity. As shown in FIG. 5, reflectivity for both states decreases with increasing overlayer 15a thickness until a minimum on-state reflectivity of about 72 percent is obtained at $\lambda/4n_o$.

FIG. 5 shows that contrast ratio increases as overlayer thickness $t_o$ increases, approaching infinite contrast as overlayer thickness approaches $\lambda/4n_o$. That condition, i.e., overlayer thickness $t_o$ equals $\lambda/4n_o$, describes the modulator disclosed in U.S. Pat. No. 5,500,761. In view of such increasing contrast with increasing layer thickness, in embodiments of the present invention wherein the maximum contrast ratio at a given reflectivity contour (FIG. 4) is desired, an overlayer thickness closest to $\lambda/4n_o$ is selected. The line 41, shown in FIG. 4, is an approximation of the "maximum contrast" overlayer thickness $t_o$ for a given reflectivity. An expression for the line 41, which predicts underlayer thickness $t_u$ as a function of underlayer and substrate refractive index and a selected overlayer thickness, is given by:

$$t_u = \lambda/4n_s - t_o n_o/n_s [0.45 + 0.78(n_o - n_s^{0.5})]$$

If the thickness $t_o$ of the overlayer is zero, then the membrane has just a single layer having a refractive index about equal to that of the substrate. As noted above, such a single-layer membrane has higher reflectivity than the double-layer membrane. In particular, as shown in FIG. 5, reflectivity is about 91 percent in the on-state and 31 percent in the off-state. Insertion loss is low, but so is the contrast ratio.

For embodiments of the present modulator having a two-layer membrane, the overlayer thickness $t_o$ falls between the above-noted extremes, i.e., $0 < t_o < \lambda/4n_o$. In a presently preferred embodiment, on-state reflectivity is about 80 percent and off-state reflectivity is about 6 percent. Eighty percent reflectivity corresponds to an insertion loss of less than about 1 dB, and, with 6 percent minimum reflectivity, equates to a contrast ratio of over 13:1. Such performance is acceptable for a variety of communications applications.

Figure 6:
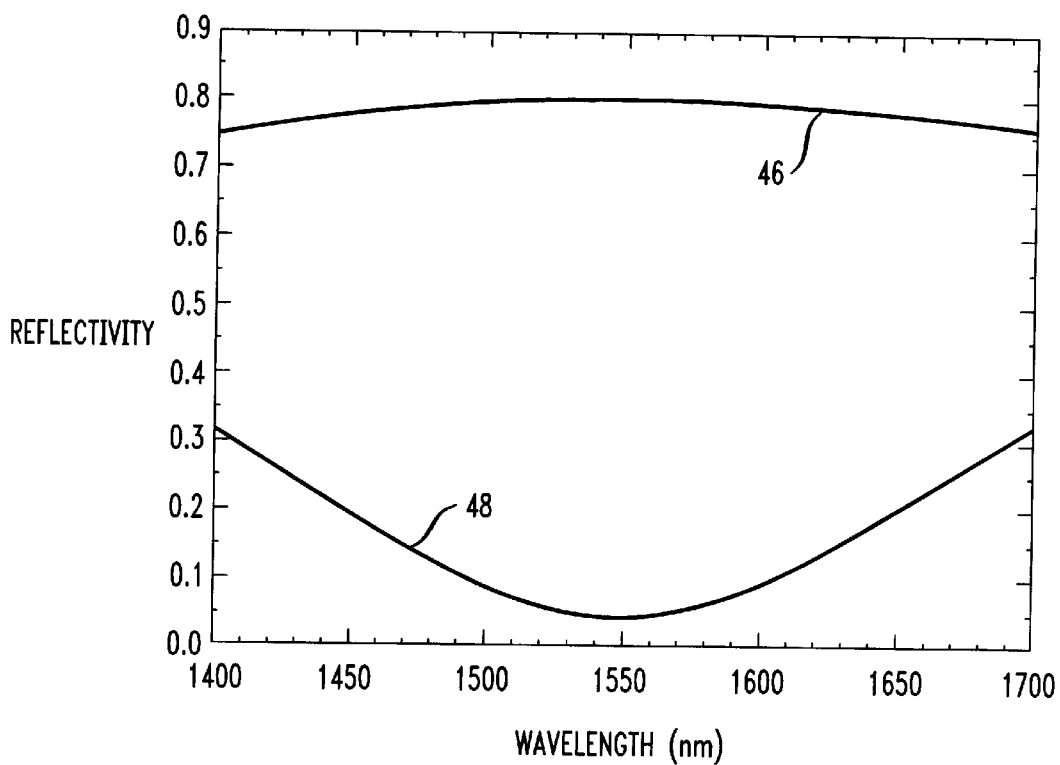
FIG. 6 shows the performance of a preferred embodiment of the present invention.

An exemplary embodiment of the present modulator suitable for achieving the aforementioned performance has a two-layer membrane including an overlayer with refractive index $n_o = 2$ and a underlayer and substrate with $n_u = 3.48$. The device has an on-state gap 30 of about $3\lambda/4$ ($0.72\lambda$) and an off-state gap 30 of about $\lambda/2$ ($0.54\lambda$). Overlayer thickness $t_o$ equals 1554 nm which equates to about 0.2 $\lambda$ (as measured in the overlayer). The overlayer thickness determines underlayer thickness $t_u$ according to the previously presented expression. Underlayer thickness is 606 nm which equates to about 0.14 $\lambda$ (as measured in the underlayer). The performance of such an exemplary modulator is shown in FIG. 6. On-state reflectivity is indicated by plot 46 and off-state reflectivity is shown by plot 48.

Note that for the above example, the refractive index of the overlayer is not about equal to $3.48^{1/2}$, i.e., 1.87, but rather is equal to 2.0. Such variation is within the range of acceptable values described above. An overlayer having an index of 1.87 may be preferred from the perspective of the optical properties of the device (when the substrate index is 3.48). Such an index may not be preferably from the point of view of membrane robustness since the relevant mechanical properties of a material such as, for example, silicon nitride, cannot be adjusted or tailored independent of its index. In particular, if the overlayer is silicon nitride having an index of 1.87, the layer may be unable to withstand the stresses generated at high modulator bit rates. As such, a higher index, e.g., 2.0, may be preferable in some embodiments for mechanical considerations.

The present modulator is fabricated using standard photolithographic processing steps including the sequential deposition and patterning of the various materials layers. For drum-head-configured modulators in which the membrane substantially completely overlaps the surrounding supporting layer, etchant is delivered via the damping holes to the sacrificial material located underneath the membrane to effect its removal, releasing the membrane. Typically, a glass such as, for example, phosphoro-silicate glass (PSG), is used as the sacrificial material. HF-based etches may be used for etching such a glass. For further description of a method for fabricating drum-head-configured modulators, see U.S. patent application Ser. No. 08/805,255. A fabrication method for another modulator configuration that may be suitably adapted for use with the present invention wherein the membrane is supported over the substrate by several arms is described in U.S. Pat. No. 5,500,761.

Although specific embodiments of this invention have been described herein, it is to be understood that these embodiments are merely illustrative of the principles of this invention. Numerous and varied modifications may occur to, and be implemented by, those of ordinary skill in the art in view of the present teachings without departing from the scope and the spirit of the invention.

I claim:

1. A device for modulating an optical signal comprising:
   a substrate and a movable membrane separated by a gap, the gap defining an optical cavity, wherein,
   the substrate and the membrane are physically adapted to receive a voltage for generating a force sufficient for moving the movable membrane from a first position, maintained in the absence of the voltage, toward a second position closer to the substrate when voltage is applied, the change in position of the membrane causing a change in the gap and a change in device reflectivity, characterized in that, the membrane has a first reflectivity and the substrate has a second unequal reflectivity, the first and second reflectivities being selected to result in the device having an insertion loss of less than about 1.4 dB and an operating bandwidth greater than about 142 nm.

2. The device of claim 1, and further wherein the movable membrane is a single layer of material characterized by a first refractive index and having a thickness of about one-quarter of wavelength of the optical signal, and wherein the substrate is characterized by a second refractive index and the first and the second refractive indices are about equal.

3. The device of claim 1, and further wherein the movable membrane comprises an overlayer characterized by a first refractive index and an underlayer characterized by a second refractive index and wherein the substrate is characterized by a third refractive index wherein the second and the third refractive indices are about equal and the first refractive index is within the range of from about 0.8 to 1.2 times the square root of the third refractive index.

4. The device of claim 1, and further wherein the device has an on-state reflectivity of at least about eighty percent and an off-state reflectivity of less than about six percent over an operating bandwidth of 60 nm.

5. The device of claim 1, and further wherein the device has an on-state reflectivity of less than about six percent and an off-state reflectivity of at least about eighty percent over an operating bandwidth of 60 nm.

* * * * *